Oct. 8, 1940.　　　A. E. KRICK ET AL　　　2,217,592
WELL REAMER
Filed Aug. 1, 1938
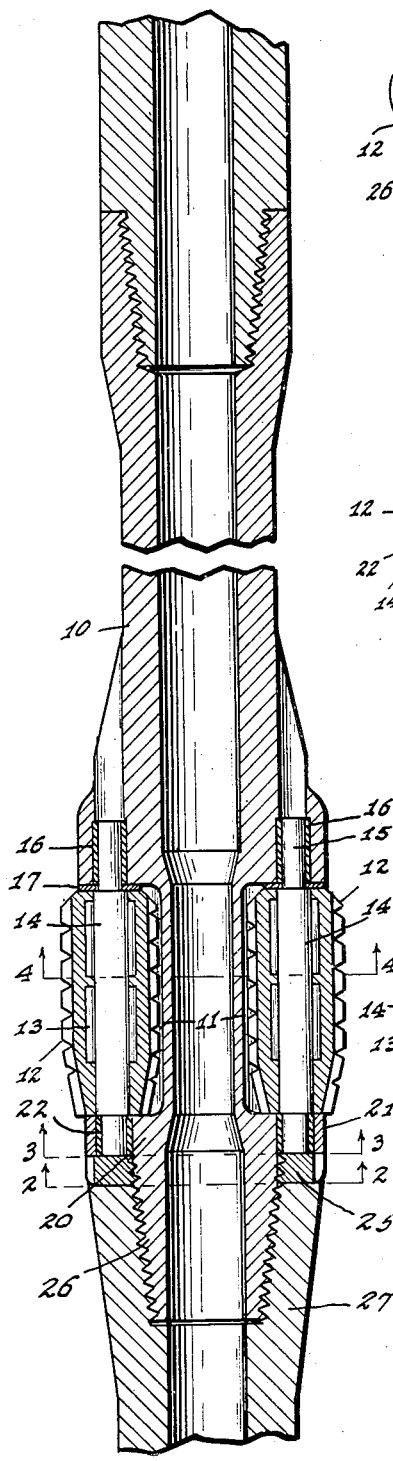
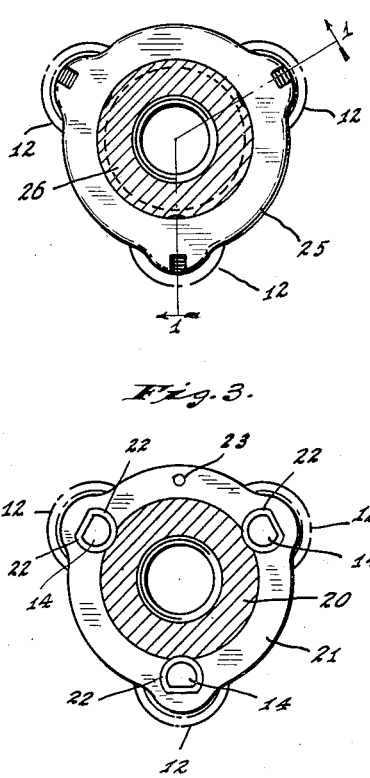
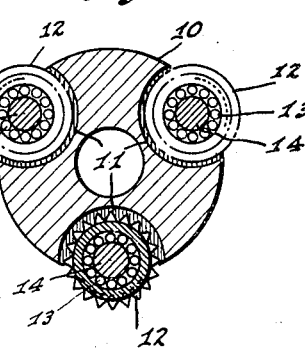
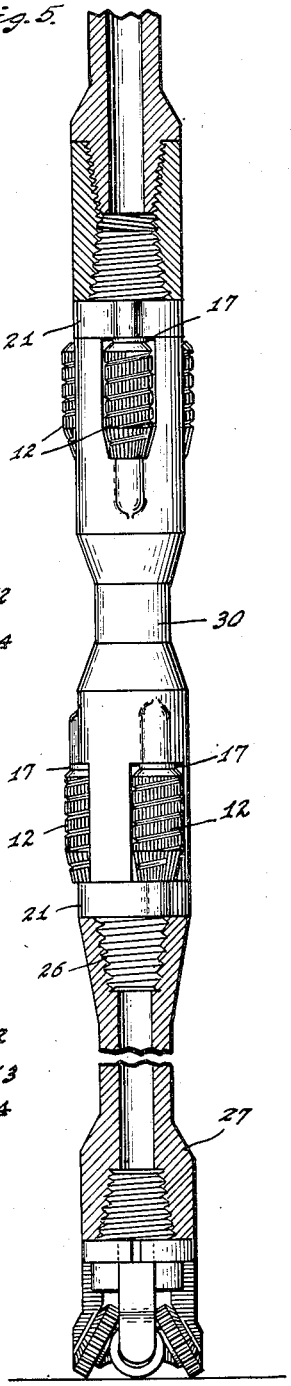
INVENTORS.
ARTHUR E. KRICK and
WILLIAM CARLETON STARKEY,
BY
ATTORNEYS.

Patented Oct. 8, 1940

2,217,592

UNITED STATES PATENT OFFICE 2,217,592

WELL REAMER

Arthur E. Krick and William Carleton Starkey, Indianapolis, Ind., assignors to L. G. S. Devices Corporation, Indianapolis, Ind., a corporation of Indiana Application August 1, 1938, Serial No. 222,340

4 Claims. (Cl. 255—73)

Our invention relates to well reamers, and has for its primary object the provision of a reamer from which the cutters may be readily removed. More specifically, it is our object to hold the cutters in place by means which will be positive in action and which embody no parts that can become dislodged during operation. A further object of our invention is to employ the torque transmitted through the drill-pipe to tighten and maintain tightened the means which hold the reamer cutters in place.

In carrying out our invention in its preferred form, we provide a reamer-body having near one end an annular series of recesses for the reception of the reamer cutters. Each reamer cutter is mounted upon a shaft having its inner end supported in one end wall of the associated recess and its other end supported in a collar slidably mounted on the reamer body. Outwardly beyond this collar, the reamer body has a screw-threaded extension upon which is mounted a member engaging the collar and holding it in place. This member may be an adjacent section of drill pipe, or it may be a nut having no other function than that of holding the collar in place. If a nut is employed, it is preferably so arranged that the adjacent section of drill pipe abuts against it to serve, in effect, as a lock-nut. Whether the adjacent pipe-section is used as a lock-nut or as the primary retaining means, it is tightened and maintained tightened by the torque which the drill pipe transmits.

The accompanying drawing illustrates our invention:

Fig. 1 is a longitudinal section on the line 1—1 of Fig. 2 showing the reamer and two adjacent sections of drill pipe connected thereto; Figs. 2, 3 and 4 are transverse sections of the lines 2—2, 3—3, and 4—4, respectively, of Fig. 1; and Fig. 5 is a side elevation of part of a drill pipe embodying a reamer of modified construction.

In the arrangement illustrated in Figs. 1 to 4, the reamer body 10 is provided near its lower end with three angularly spaced recesses 11 in each of which is located a reamer cutter 12. Each cutter 12 is mounted, desirably through anti-friction bearings such as roller bearings 13, upon a shaft 14. The upper end of each shaft 14 has an extension 15 of reduced diameter supported from the reamer body, preferably through the medium of a replaceable bushing 16. A replaceable thrust washer 17 may be disposed between the end of each cutter 12 and the adjacent end wall of the associated recess.

If roller bearings are employed between each reamer-cutter 12 and its associated shaft, I prefer to dispose the rollers within a recess in the bore of the cutter so that they will be located axially by engagement with the end walls of such recess, as shown. This arrangement prevents locking of the cutter which might otherwise occur as the result of one or more rollers assuming a position not parallel with the cutter-axis.

The cutters 12 may have teeth of any desired type, such as spur-teeth, worm-teeth, or spiral-teeth, all of which are well known in the art.

At the lower ends of the recesses 11, the reamer-body 10 is reduced in diameter to provide a portion 20 upon which a collar 21 is axially slidable. The lower ends of the shafts 14 are supported in this collar, desirably through the medium of replaceable bushings 22.

We find it desirable to prevent rotation of the shafts 14 in the respective bushings 22 and also to prevent rotation of the bushings within the collar 21. For this reason, the lower end of each shaft 14 is reduced in diameter and made of non-circular cross-section, as by flattening one side thereof in the manner indicated in Fig. 3. The hole in each of the bushings 22 is of similar shape, and each bushing is of non-circular form exteriorly as indicated in Fig. 3.

To prevent rotation of the collar 21, which would tend to throw the shafts 14 out of parallelism with the axis of the reamer body, the portion 20 of the reamer body may be provided with grooves and the bushings 22 made of such a diameter that they extend into such grooves to serve as keys locating the collar 21 in definite angular position upon the reamer-body. In addition, if desired, a dowel pin 23 may be employed to locate the collar upon the reamer-body.

In the arrangement shown in Fig. 1 the collar 21 is held in place against the shoulder above it by a nut 25 mounted upon a screw-threaded extension 26 of the reamer body. When such a nut is used, it is desirably so arranged that the section of drill-pipe 27 below the reamer abuts against the lower face of the nut 25 to act as a lock-nut. With such an arrangement, the torque transmitted through the drill-pipe tends to maintain the pipe-section 27 in firm engagement with the nut 25 and the nut 25 in firm engagement with the collar 21.

In the arrangement illustrated in Fig. 5 the reamer-body 30 is provided with two sets of reamer cutters 12, located respectively at the upper and lower ends of the reamer body. In this arrangement, we have shown the nuts 25 as dispensed with, and the collars 21 are held in place by direct engagement with adjacent sections of drill-pipe. I use the expression "section of drill-pipe," to include a coupling, the drill collar, the drill-head, or in short, any portion of the whole drill-pipe assembly which transmits the driving torque.

While the nut 25 may be dispensed with, as is shown by way of example in the arrangement of Fig. 5, it serves, when used, to hold the collar 21 and the cutters 12 in place when the reamer is removed from the drill pipe.

When it is desired to replace the cutters 12 or any of the bushings 16 and 22 or any of the thrust washers 17, it is necessary only to remove the adjacent section of drill-pipe, and the nut 25 if such nut is used. Thereupon, the collar 21 may be slid axially off the body portion 20, the shafts 14 moved axially outwardly until their inner ends clear the end walls of the recesses 11, and the cutters and shafts can then be removed. With the cutters and shafts removed, any of the cutters, shafts, bushings, or thrust washers can readily be replaced.

We claim as our invention:

1. In combination, a well reamer body having at one end a portion of reduced diameter provided with screw-threads for receiving an adjacent section of the drill pipe, a collar axially slidable upon said portion of reduced diameter, a plurality of cutter-shafts extending longitudinally of said body, cutters on said shafts, each of said shafts having one end supported in said body and the other end supported in said collar, and a member mounted on said screw-threads for retaining said collar in place, the collar-supported ends of said shafts being of non-circular cross-section and said collar being provided with non-circular openings receiving such shaft-ends.

2. In combination, a well reamer body having at one end a portion of reduced diameter provided with screw-threads for receiving an adjacent section of the drill pipe, a collar axially slidable upon said portion of reduced diameter, a plurality of cutter-shafts extending longitudinally of said body, cutters on said shafts, each of said shafts having one end supported in said body and the other end supported in said collar, replaceable bushings on the collar-supported ends of said shafts, said bushings being seated in part in said collar and in part in said body, and a member mounted on said screw-threads for retaining said collar in place.

3. The invention set forth in claim 2 with the addition that the collar-supported ends of said shafts are of non-circular cross-section, said bushings being provided with non-circular openings receiving such shaft-ends.

4. In combination, a well reamer body having at one end a portion of reduced diameter provided with screw-threads for receiving an adjacent section of the drill pipe, a collar axially slidable upon said portion of reduced diameter, a plurality of cutter-shafts extending longitudinally of said body, cutters on said shafts, each of said shafts having one end supported in said body and the other end supported in said collar, replaceable bushings on the collar-supported ends of said shafts, said bushings being seated in part in said collar and in part in said body, and means for retaining said collar in place on said reamer body.

ARTHUR E. KRICK.
WILLIAM CARLETON STARKEY.